（12）United States Patent
Pires Cabado et al.

(10) Patent No.: US 11,454,342 B2
(45) Date of Patent: Sep. 27, 2022

(54) FLANGE SEAL FOR PIPE AND REPAIR OF PIPES

(71) Applicants: Barbara Inés Pires Cabado, Barcelona (ES); Elisabet Patricia Pires Cabado, Barcelona (ES)

(72) Inventors: Barbara Inés Pires Cabado, Barcelona (ES); Elisabet Patricia Pires Cabado, Barcelona (ES)

(73) Assignee: UNIONES ARPOL, S.A., Premia de Dalt (ES)

( * ) Notice: Subject to any disclaimer, the term of this patent is extended or adjusted under 35 U.S.C. 154(b) by 230 days.

(21) Appl. No.: 16/361,466

(22) Filed: Mar. 22, 2019

(65) Prior Publication Data

US 2020/0003353 A1 Jan. 2, 2020

(51) Int. Cl.
*F16L 55/178* (2006.01)
*F16L 21/02* (2006.01)

(52) U.S. Cl.
CPC ........... *F16L 55/178* (2013.01); *F16L 21/022* (2013.01)

(58) Field of Classification Search
CPC ..... F16L 55/178; F16L 55/172; F16L 21/022; F16L 21/065; F16L 17/04
USPC ........................................................ 285/367
See application file for complete search history.

(56) References Cited

U.S. PATENT DOCUMENTS

| | | | | |
|---|---|---|---|---|
| 2,403,449 A | * | 7/1946 | Meyer | F16L 33/04 24/279 |
| 2,457,077 A | * | 12/1948 | Woolsey | F16L 23/08 285/340 |
| 2,474,431 A | * | 6/1949 | Lipman | F16L 21/005 285/367 |
| 3,014,259 A | * | 12/1961 | Joseph | F16L 3/1008 24/284 |
| 3,565,468 A | * | 2/1971 | Garrett | F16L 21/005 285/373 |

(Continued)

FOREIGN PATENT DOCUMENTS

| | | | | |
|---|---|---|---|---|
| DE | 102012001439 A1 | * | 8/2013 | ............ F16L 21/065 |
| EP | 0079457 A1 | * | 5/1983 | ............ F16L 55/172 |

(Continued)

OTHER PUBLICATIONS

English translation of the description portion of EP0079457—from the EPO—retrived on Feb. 13, 2021.*

*Primary Examiner* — Zachary T Dragicevich
*Assistant Examiner* — James A Linford
(74) *Attorney, Agent, or Firm* — Blue Filament Law PLLC

(57) ABSTRACT

A watertight flange for jointing and repairing pipes is provided that includes a ring-shaped sealing gasket (2) and a metal body (3) that is perimetrically coupled on the circular surface of the ring-shaped gasket (2). The sealing gasket (2) and the metal body (3) are pressed by closing and clamping elements externally incorporated determined by bolts (4) transversally inserted in respective pairs of parallel through-axles (5) and joined integral with the metal body (3). The metal body (3) has approximately the same length as the ring-shaped gasket (2), with respective lateral ends perpendicularly folded inward and having radial cuts (31) that define related rims (32) that determine retaining means of the said ring-shaped gasket (2) in the metal body (3) and, eventually, means interlocking the watertight flange (1) itself on the surface of the pipes to be jointed.

4 Claims, 1 Drawing Sheet

(56) References Cited

U.S. PATENT DOCUMENTS

| | | | | |
|---|---|---|---|---|
| 7,591,055 B2 * | 9/2009 | Gibb | ........................ | F16L 17/04 |
| | | | | 29/282 |
| 2001/0047572 A1 * | 12/2001 | Cassel | ...................... | F16L 33/04 |
| | | | | 24/279 |
| 2007/0126234 A1 * | 6/2007 | Wirth | .................... | F16L 21/065 |
| | | | | 285/410 |

FOREIGN PATENT DOCUMENTS

| | | | | | |
|---|---|---|---|---|---|
| EP | | 0989349 A1 * | 3/2000 | ............ | F16L 55/172 |
| FR | | 2662489 A1 * | 11/1991 | .............. | F16L 21/08 |

\* cited by examiner

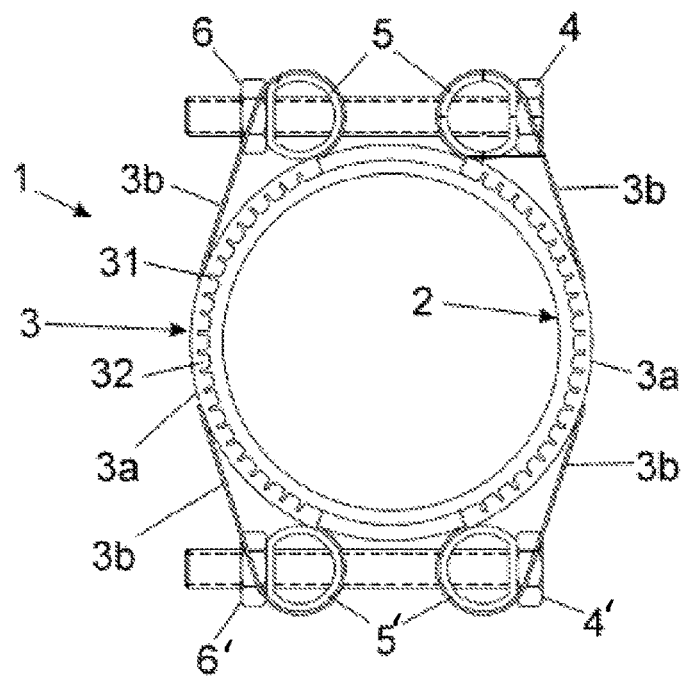
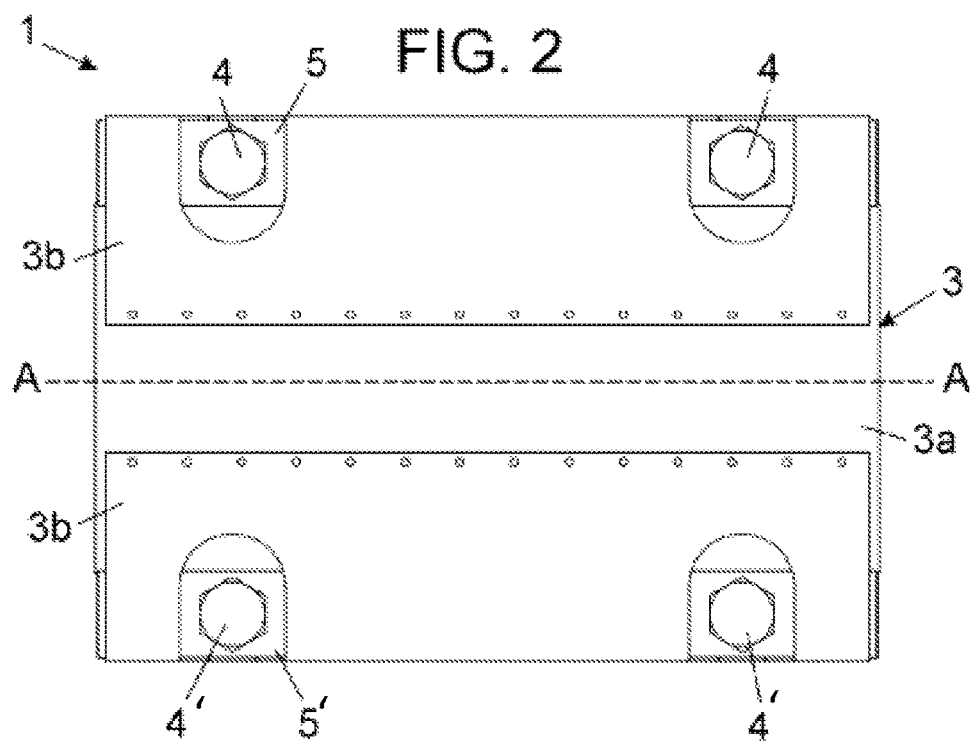

FLANGE SEAL FOR PIPE AND REPAIR OF PIPES

OBJECT OF THE INVENTION

The invention, as stated in the title of this specification refers to a watertight flange for jointing and repairing pipes that provides, to the function to which it is designed, advantages and characteristics of novelty, that are disclosed in details thereafter and that means an improvement of the current state-of-art.

The object of this invention refers to a watertight flange of those designed for its incorporation as a safe joining means at the joint between the ends of two segments of pipes having a same diameter for driving fluids at high or low pressure or as a mean for repairing a damaged pipe which, being formed out of a ring-shaped sealing gasket on which a pressed metal body is perimetrically coupled, in turn, by means of closing and clamping elements incorporated externally to it, presents a series of improvements that, concretely focused in the configuration of the ends of the said body and in the configuration of the closing and clamping elements, provide an higher effectiveness to the joint and repair, among other advantages.

FIELD OF APPLICATION OF THE INVENTION

The field of application of this invention is within the sector of the industry engaged in producing joining and clamping apparatuses and devices for pipes or tubes, focusing namely in the scope of jointing and repairing flanges.

BACKGROUND OF THE INVENTION

As reference to the current state-of-art, it shall be stated that, although multiple types and models of watertight flanges for jointing and repairing pipes of the type herein involved are known, at least the applicant is not aware of the existence of any that possesses technical and structural characteristics equal or similar to those that the watertight flange herein claimed presents.

In this sense, it shall be stated that, for example, by the Spanish documents U8600595, U8600609, U8603209, P8803941, P9401300 and P9601830, and the documents ES1072963U, ES1076167U, ES2212732A1, different embodiments of flanges for watertight jointing and repairing pipes are known, which, although they meet more or less satisfactorily the objectives of water tightness required in jointing and repairing to which they are designed, show some features that could be improved.

Namely the flange disclosed in the patent ES2212732A1, that can be considered the closest to the flange of this invention, in which could be improved features so essential as the complexity thereof because, to achieve the means for holding and anchoring that characterize it for its use in pipes having smooth ends and without protrusions, it incorporates a plurality of elements that significantly complicate its production and consequently, rise its production cost, therefore, one of the objectives of this invention is to provide a new flange that with a much more simple structure offers similar performances.

In addition, another of the features that could be improved are the external closing and clamping elements of the flange, which also complicate and lift the production cost thereof as they are formed by bolts with threaded studs that are threaded in holes provided with additional threads designed to that effect in the through-axles to which they are incorporated, a second objective of this invention being to provide a new flange with closing and clamping elements thereof also more simple but with the same or higher effectiveness.

EXPLANATION OF THE INVENTION

The watertight flange for jointing and repairing pipes that the invention proposes is therefore configured as a significant novelty within its field of application, because when implementing it, the above-mentioned objectives are satisfactorily achieved, the characterizing details making it possible and distinguishing it being duly appearing in the final claims attached to this description.

More concretely, what the invention proposes, as it was stated before, is a watertight flange of those designed for their incorporation as a safe joining means when jointing between the ends of two segments of pipes having a same diameter for driving fluids at high or low pressure or as means for repairing a damaged pipe, which possesses a series of improvements that, among other advantages, provide higher effectiveness to the safety to the joint and repair namely facing eventual axial displacements thereof or of some of its parts on the ends of the said tubes.

For this, as it is formed out of a ring-shaped sealing gasket, that preferably is made of epdm rubber (ethylene propylene diene monomer rubber) and in which the two ends of the respective pipe segments to be jointed are inserted, and a metal body, normally of steel, that is perimetrically coupled on the circular surface of the said ring-shaped gasket being pressed by closing and clamping means externally incorporated to it, preferably in points diametrically opposite of its circumference, which concretely are determined by bolts transversally inserted in respective pairs of though-axles that, parallel to each other, are joined integral and lengthwise, that means, parallel to the axial axis of the flange, on the metal body attached through respective extensions in which the said through-axles are inserted so that the threaded tightening of the said bolts determines the mutual coming closer of each pair of through-axles and, consequently, pressing the metal body on the ring-shaped gasket and, in turn, pressing this later on the pipes.

In addition, from this already known configuration, one of the essential features of the flange of the invention is provided by the fact that the said metal body, that has approximately the same length as that of the ring-shaped gasket, possesses, in its respective lateral ends, that are perpendicularly bent inwards it, a series of radial cuts that define related rims oriented towards the surface of the pipes on which the flange is incorporated.

This way, the said rims are having a double function: on the one hand, they act as retaining elements on the ring-shaped gasket itself, because they prevent the axial displacement thereof with respect to the metal body, as the said gasket remains shut on both sides in between the said rims; and on the other hand, they can act as retaining on the pipes themselves, as it is possible to determine an interlocking means on their surface preventing their axial sliding.

In addition, although optionally, in a preferred embodiment of the flange of the invention, the bolts it comprises as closing and clamping elements of the metal body on the ring-shaped gasket, instead of threading in threaded holes of the trough-axles, as is the usual solution used up to now, they are bolts that pass, without threading, by through holes provided to that effect in the trough-axles and incorporate respective threaded nuts at their ends.

This arrangement of the closing and clamping means, in addition to avoid machining to incorporate the thread in the holes of the through-axles, provide a more significant advantage, and it is that it facilitates to a large extent the operation of the said closing and suction, because, as the said direct threading between bolts and through-axles is not required, a perfect perpendicular alignment between both is not necessary, which, on the other hand, is usually common enough because of the eventual tolerances and movements that occur between the different elements of the joint.

The disclosed watertight flange for jointing and repairing pipes consists, therefore, in an innovating structure having characteristics unknown up to now for the purpose to which it is designed, reasons that together with its practical utility, provide it with sufficient ground to obtain the privilege of exclusivity that is applied for.

DESCRIPTION OF THE DRAWINGS

To complement the description that is being done and in order to assist to best understanding the characteristics of the invention, attached to this specification as an integral part thereof, there is a drawing in which for illustration and non-limiting purpose the following has been represented:

The FIG. 1.—It shows a schematic front elevation view of an example of the watertight flange for jointing and repairing pipes, object of the invention, the main parts and elements that it comprises can be seen;

The FIG. 2.—It shows a schematic side elevation view of the 15 example of the watertight flange for jointing and repairing pipes, according to the invention, shown in the FIG. 1, the configuration of its parts and elements can be seen from the said point of view; and The FIG. 3.—It shows a part view of the section of the flange 20 according to the section A-A shown in the FIG. 2, the configuration of the profile of its main parts can be seen.

PREFERRED EMBODIMENT OF THE INVENTION

At the sight of the mentioned figures, and in accordance with the numerals adopted, a non-limiting example of embodiment can be seen in them of the watertight flange for jointing and repairing pipes of the invention, which comprises what is mentioned and disclosed in details thereafter.

Thus, as it can be seen in the said figures, the flange (1) of the invention is formed, in a well-known manner, out of a ring-shaped sealing gasket (2) for example of rubber, and a metal body (3), for example of steel, that is perimetrically coupled on the circular surface of the ring-shaped gasket (2) pressed by closing and clamping elements externally incorporated and that are determined by bolts (4,4') transversally inserted in respective pairs of parallel through-axles (5,5').

More specifically, in the example that is shown in the figures, and that represents the preferred embodiment of the invention, the metal body (3) of the flange (1) is constituted by two half-cylinders (3a) joined by two sets of closing and clamping elements located in points diametrically opposite on the ring-shaped gasket (2), each set comprising two bolts (4,4') inserted in each through-axles (5,5') that, in turn, are joined integral to the said half-cylinders forming the metal body (3) by means of respective extensions (3b) fixed integral to each other.

In any case, the said watertight flange (1) is distinguished by the fact that the metal body (3), that, at least in the said half-cylinders (3a), possesses approximately the same length as the ring-shaped gasket (2), presents its respective lateral ends perpendicularly folded inwards it and provided with a plurality of radial cuts (31) that define related rims (32) that constitute retaining means of the said ring-shaped gasket (2) in the metal body (3) and, eventually, means interlocking the watertight flange (1) itself on the surface of the pipes to be jointed.

According to the FIG. 1, the configuration of one of the lateral folded ends of the metal body (3) can be seen with the radial cuts (31) defining the plurality of rims (32) that retain the edge of the ring-shaped gasket (2).

In the section of the FIG. 3 the said retention of the rims (32) can be seen by both ends of the ring-shaped gasket (2), which presents, close to both edges, a thickening (21) that, oriented toward the center of the gasket, defines a chamber (22), which, when the pipes are to carry fluids under high pressure, acts as a retaining means of the said fluid, therefore the rims (32) also mean strengthening the pressure exerted on the said edges of the ring-shaped gasket (2).

In addition, preferably, the bolts (4,4') are inserted without threading in holes 15 made to that effect in the through-axles (5,5') and they are threaded by the end opposite to the said insertion, in respective nuts (6,6') to achieve closing and clamping the flange (1).

The nature of this invention being sufficiently described, as well as the manner to implement it, it is not deemed necessary to extend any longer its explanation in order that any person skilled in the art understands its extent and the advantages derived from it, and it is stated that, within its essence, it can be implemented in other embodiments that differ in detail from the one indicated for example purpose, to which the protection sought shall apply, provided that its main principle is not altered, changed or modified.

The invention claimed is:

1. A watertight flange for jointing and repairing pipes comprising:
   a ring-shaped sealing gasket having a circular surface,
   a metal body having a metal body length and lateral ends perimetrically coupled on the circular surface of the ring-shaped gasket and having a plurality of U-shaped radial cuts extending along a portion of the metal body length; and
   closing and clamping elements comprising:
      a first pair of bolts on opposing sides of the metal body from a second pair of bolts; and
      a first pair and a second pair of parallel through-axles on opposing sides of the metal body, each individual through-axle of the pairs of parallel through-axles having a distally oriented external flat portion and through which an individual bolt from one of the pairs of bolts is transversally inserted, the first and second pairs of parallel through-axles joined integral with the metal body wherein the metal body length is the same length as the ring-shaped gasket and the metal body lateral ends are perpendicularly folded wherein a first pair of nuts engage the first pair of bolts and the respective external flat portions, where the first pair of bolts extend beyond the distally oriented external flat portion to encompass the first pair of parallel through-axles, and a second pair of nuts engage the respective external flat portions and the second pair of bolts that extend beyond the distally oriented external flat portions, the second pair of bolts inserted into the second pair of parallel through-axles to achieve closing and clamping of the watertight flange.

2. The watertight flange of claim 1 wherein the ring-shaped sealing gasket is formed of ethylene propylene diene monomer rubber.

3. The watertight flange of claim 1 wherein the metal body is formed of steel.

4. The watertight flange of claim 1 wherein the plurality of radial cuts extend between the pairs of parallel through-axles.

\* \* \* \* \*